Figure 6:
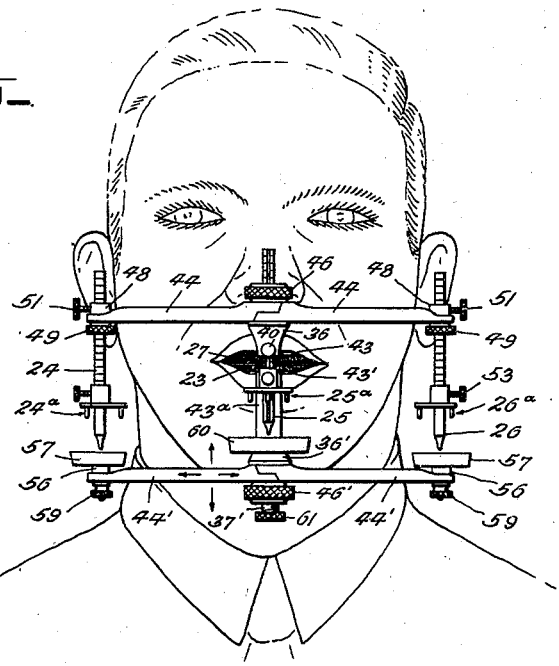

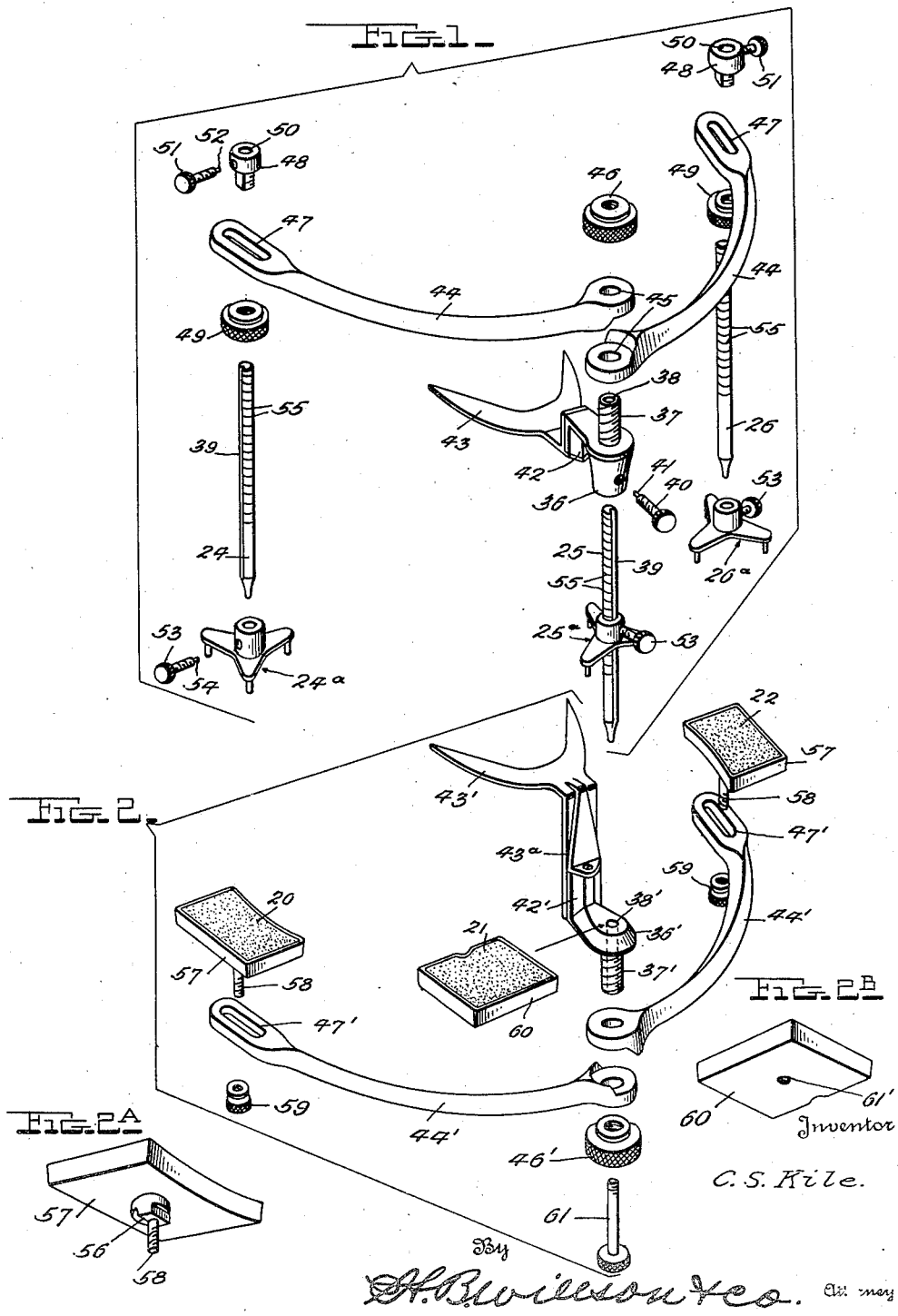

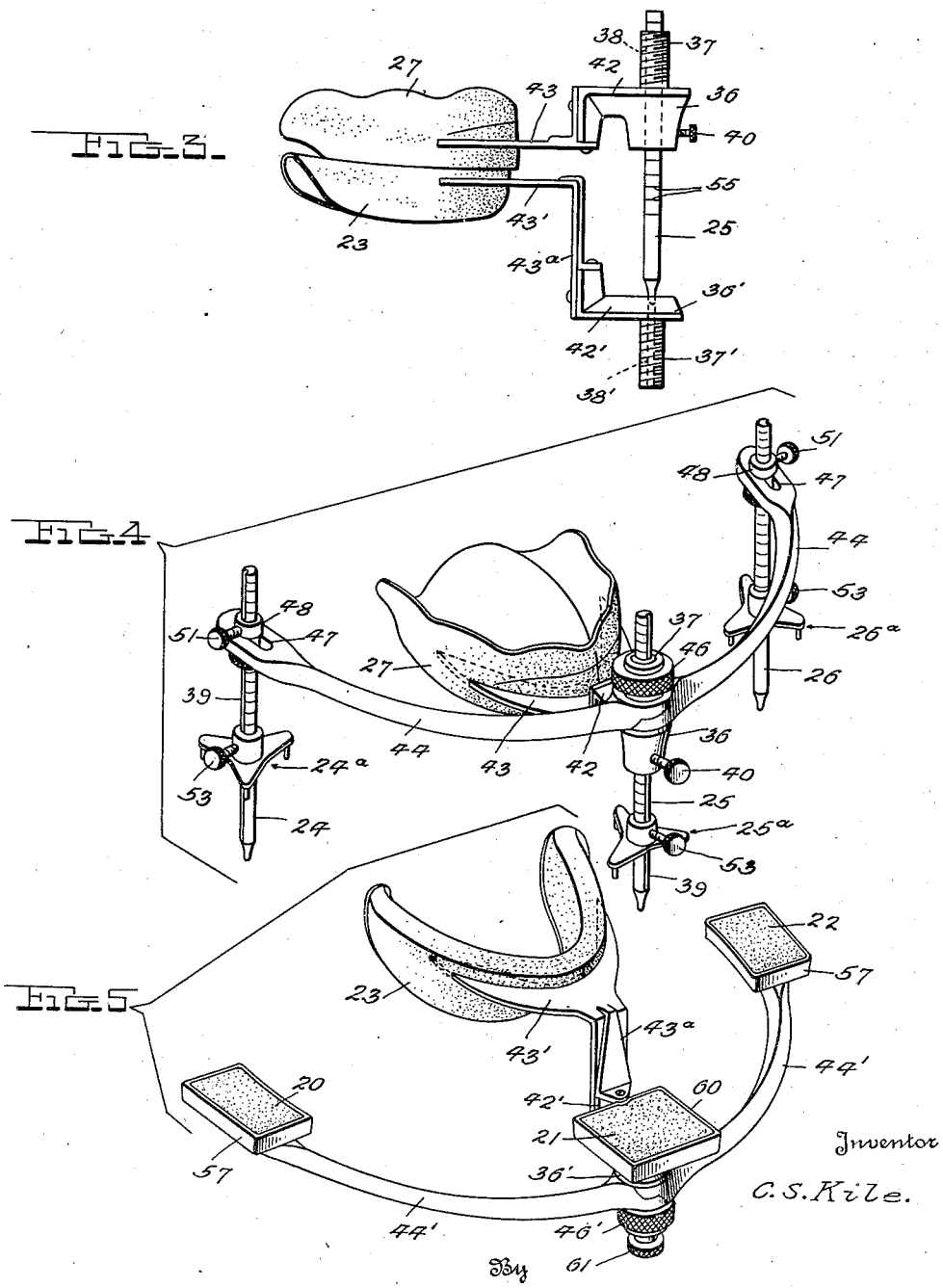

April 8, 1947.  C. S. KILE  2,418,648
METHOD AND APPARATUS FOR PRODUCING ARTIFICIAL DENTURES
Filed Oct. 13, 1943  4 Sheets-Sheet 4
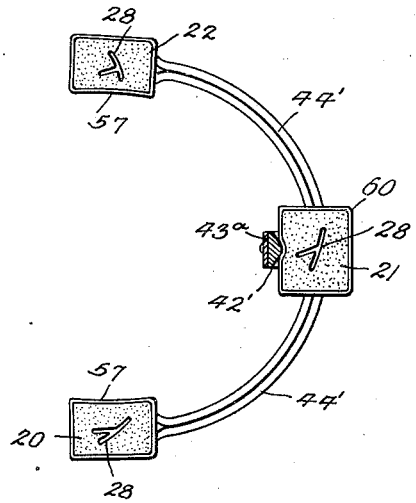
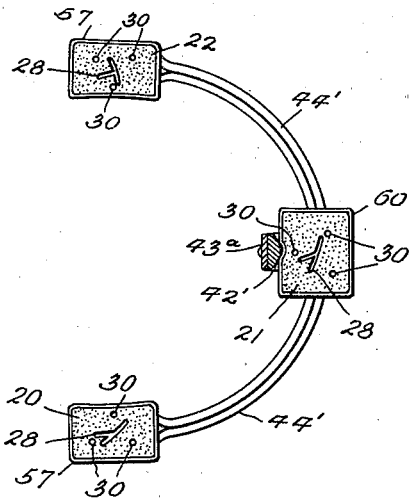
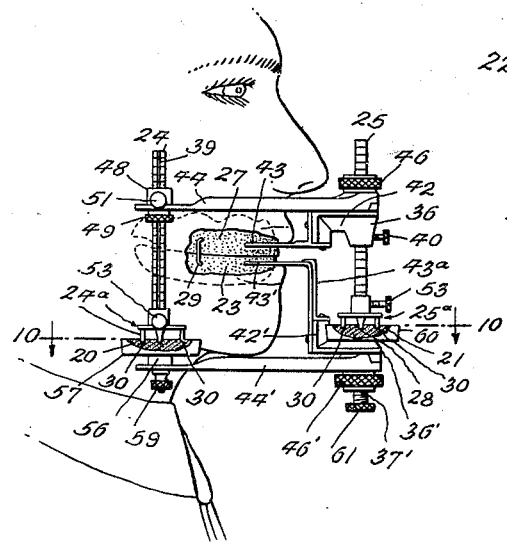
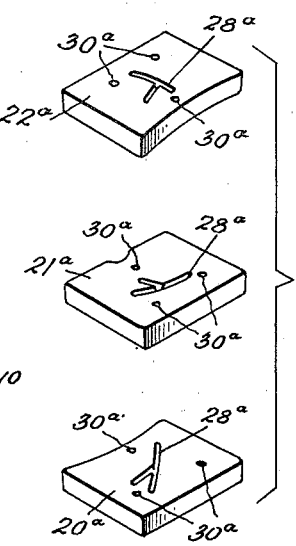
Inventor
C. S. Kile.
By H. B. Willson & Co. Attorney Patented Apr. 8, 1947

2,418,648

UNITED STATES PATENT OFFICE 2,418,648

METHOD AND APPARATUS FOR PRODUCING ARTIFICIAL DENTURES

Clifford S. Kile, Hutchinson, Kans.

Application October 13, 1943, Serial No. 506,099

9 Claims. (Cl. 32—19)

The invention aims to make novel and effective provision for aiding in the production of artificial dentures which will insure the correct disposition of the masticating surfaces and hence will unobstructedly permit all natural jaw movements, particularly when chewing.

The invention contemplates means to record the lateral, protrusive and restrusive movements of the human jaw as exhibited during the process of mastication, permitting use of the records in constructing an accurate articulating device for the proper arrangement of the artificial teeth, thus making it possible to reproduce the jaw movements in exactly the same manner that the patient moved the jaw while making the original recordings and to arrange the artificial teeth in harmony with the recorded movements, to the end that no further adjustment of the artificial teeth or dentures is necessary after being placed in the patient's mouth. The above mentioned articulating device forms the subject matter of my divisional application Serial No. 571,842, filed January 8, 1945.

In carrying out the above objects, a further aim is to provide for giving due consideration to the flexibility of the temporomandibular articulation, and the resiliency of the tissues of the jaws upon which the dentures rest.

Still further objects are to so form soft deeply grooved records of the patient's jaw movements, that corresponding but hard jaw-movement records, later constituting parts of an articulator and constructed with the aid of said soft records, may accurately guide the relative movements of the two bite plates in said articulator, in a manner exactly duplicating the natural relative movements of the patient's jaws, thereby permitting proper application of the teeth to said bite plates and allowing any necessary adjustments and/or grinding of said teeth to prevent them from later interfering with the natural jaw movements when embodied in the fully completed dentures.

A still further object is to provide for attaining the desired end in a relatively simple and inexpensive manner, and without making any measurements, mathematical calculations or guesswork adjustments.

Figure 1 of the accompanying drawings is an exploded perspective illustrating the recording pins 24, 25 and 26 and the preferred apparatus for rigidly connecting them with the upper bite plate 27.

Fig. 2 is a view similar to Fig. 1 showing the soft record-forming members 20, 21 and 22 and the preferred apparatus for rigidly connecting them with the lower bite plate 23.

Figs. 2A and 2B are detail perspectives showing the bottoms of two of the pans which hold the record-forming members in Fig. 2.

Fig. 3 is a side elevation showing the bite plates 27 and 23 connected with the bifurcated plates shown in Figs. 1 and 2 respectively.

Fig. 4 is a perspective showing the recording pins 24, 25 and 26 rigidly connected with the upper bite plate 27 by means of elements shown in Fig. 1.

Fig. 5 is a perspective showing the record-forming members 20, 21 and 22 rigidly connected with the lower bite plate 23 by means of elements shown in Fig. 2.

Figure 7:
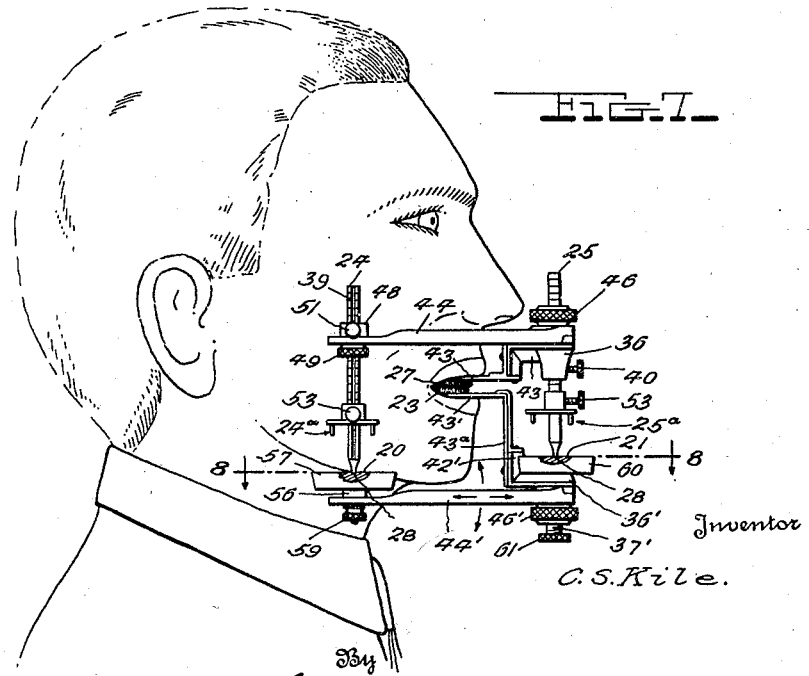

Fig. 6 is a front elevation and Fig. 7 is a side elevation showing the manner in which the soft records 20, 21 and 22 are formed while the patient performs natural jaw movements.

Fig. 8 is a horizontal section on line 8—8 of Fig. 7 showing the completely formed soft records 20, 21 and 22.

Fig. 9 is a view similar to Fig. 7, partly broken away, showing the bite plates 23 and 27 secured together and the soft records 20, 21 and 22 marked to record their relation with other elements.

Fig. 10 is a horizontal section on line 10—10 of Fig. 9 showing the marked soft records 20, 21 and 22.

Fig. 11 is a perspective on a larger scale showing the hard marked records 20$^a$, 21$^a$ and 22$^a$ which are constructed with the aid of the soft marked records.

Preferences have been illustrated but the invention is not restricted to the exact disclosure which is to be considered as illustrative rather than limiting in numerous respects.

In carrying out the method, as herein disclosed, soft record-forming members 20, 21 and 22 are rigidly connected with a lower bite plate 23 (see Fig. 5) and recording pins 24, 25 and 26 are rigidly connected with an upper bite plate 27 (see Fig. 4). The two bite plates 23 and 27 are then placed in the patient's mouth (see Figs. 6 and 7) and the record-forming members 20, 21 and 22 and the recording pins 24, 25 and 26 are disposed in cooperative relation externally of the mouth. The patient is then instructed to perform natural chewing movements, causing the recording pins 24, 25 and 26 to form jaw-movement-record-grooves 28 in the soft record-forming members 20, 21 and 22 (see Figs. 7 and 8), thus converting said members into soft jaw-movement records. The grooves 28 are formed to a substantial depth, preferably 1/16 of an inch or more, and the recording pins 24, 25 and 26 are adjusted downwardly from time to time as said grooves are being formed, rather than having the patient force said pins the full depth into the record-forming members 20, 21 and 22 at each bite.

After formation of the grooves 28, the bite plates 23 and 27 are secured together (preferably in centric position) while they are still in the patient's mouth (see Fig. 9). This securing may be accomplished by means of staples, shown at 29 in Fig. 9 and succeeding views, or in any other suitable way, for example by means of "wiggley nails," or by melting contacting portions of the bite plates and thus sealing them together.

Either before or after securing the bite plates 23 and 27 together, the soft records 20, 21 and 22 (see Figs. 9 and 10) are marked to record their exact relation (when viewed from above) with their respective recording pins and with the bite plates. This marking is preferably accomplished by forming sockets 30 (Figs. 9 and 10) in said soft records.

After securing the bite plates 23 and 27 together and marking the soft records 20, 21 and 22, said bite plates 23 and 27, said soft records 20, 21 and 22 and the recording pins 24, 25 and 26 are removed as a unit from the patient. The soft records 20, 21 and 22 are then disconnected from the lower bite plate 23 and with their aid as patterns, corresponding but hard records 20a, 21a and 22a (Fig. 11) are constructed, said hard records being adapted to form elements of an articulator and having jaw-movement-record-groves 28a and sockets 30a corresponding exactly to the grooves 28 and sockets 30 of the soft records 20, 21 and 22.

While the upper and lower bite plates 27 and 23 are still secured together and the recording pins 24, 25 and 26 are still rigidly connected with said upper bite plate 27, said pins may be engaged with the record-grooves 28a of the hard records 20a, 21a and 22a and temporarily attached to said pins in such positions that said hard records, pins and bite plates, when viewed from above, have the identical relation with each other previously existing between the soft records 20, 21 and 22, said pins and said bite plates, when viewed from above. The record markings 30a aid in establishing this relation, enabling the construction of an accurate articulator including said bite plates, pins, and hard records.

For the soft record-forming members 20, 21 and 22, a plastic deformable by pressure and having the ability to retain any form to which it may be deformed, is employed, said plastic being of about the consistency of rather stiff moulding clay. A wax-like plastic is preferable and I have found it very advantageous to form said plastic as follows:

| | Grains |
|---|---|
| Base plate wax | 170 |
| Vaseline | 130 |
| Powdered graphite | 70 |

The wax is melted and the Vaseline added, and when this mixture cools to a light jelly consistency, the graphite is added and thoroughly mixed in.

In forming the soft records, there are often many abnormal and exaggerated movements performed by the patient, due to the psychological effect of trying too hard to do the simple things, such as moving the jaw from one position to another, and while these abnormal and exaggerated jaw movements are of course recorded in the soft record-forming members, they may be readily detected and may be obliterated with a hot instrument, and the patient given a fresh start, if necessary.

For the hard records 20a, 21a and 22a, I prefer to use a readily mouldable cement which when hard will form an artificial stone. The walls of the record grooves of these hard records may be coated with graphite or other substance, if desired, to permit the pins 24, 25 and 26 to more easily slide when using the articulator including said hard records and pins.

In describing the apparatus, reference will be made first to Figs. 1 and 2 showing the preferred structural details of a number of the elements used.

A central head 36 is provided, said head having an upwardly projecting threaded neck 37. The head and neck are jointly formed with an opening 38 extending vertically therethrough to receive the recording pin 25. This pin and the pins 24 and 26 are each formed with a longitudinal groove 39. A set screw 40 is threaded into the head 36 and is provided with a reduced inner end 41 for reception in the groove 39 of the pin 25 to not only clamp said pin in vertically adjusted position, but to hold it against rotation. A rearward projection 42 of inverted L-shape is formed integrally with the head 36, and to this projection a horizontal bifurcated plate 43 is suitably secured, said plate being adapted for connection with the lower bite plate 23, as hereinafter explained. Two curved arms 44 are provided to jointly straddle the patient's face, the inner ends of said arms having openings 45 to receive the threaded neck 37 of the head 36. The walls of the openings, however, are not provided with any screw threads to engage the threads of said neck. A nut 46 is employed to be threaded upon the upper end of the neck 37 to tightly clamp the two arms 44 against relative movement with respect to each other and with respect to the head 36 after said arms have been relatively adjusted as required. The rear ends of the arms 44 are flat, and these ends are formed with longitudinal slots 47. Slides 48 are non-rotatably engageable with the slots 47 but are adapted for forward and rearward adjustment in said slots, nuts 49 being provided to clamp said slides in adjusted position. These slides are formed with vertical openings 50 to receive the recording pins 24 and 26, and each slide includes a set screw 51 having a reduced inner end 52 to engage the groove 39 of the pin, whereby the set screw may not only hold the pin in vertically adjusted position, but may hold it against rotation. Vertically adjustable and non-rotatable upon the pins 24, 25 and 26 respectively, are three marking devices 24a, 25a and 26a, preferably in the form of tripods, each of these marking devices or tripods being provided with a set screw 53 having a reduced inner end 54 to engage the groove 39 of its respective recording pin, whereby each tripod may be not only held in one position or another upon the pin but will also be held against rotation on said pin. All of these pins are preferably of blunt-pointed nature at their lower ends, with the blunt points well smoothed and rounded, and each pin is preferably formed with a plurality of vertically spaced permanent markings 55 for a purpose to appear.

The foregoing describes the elements of Fig. 1. When these elements are assembled, they rigidly connect the recording pins 24, 25 and 26 with the upper bite plate 27, as seen primarily in Fig. 4. This bite plate includes the usual wax bite rim on a suitable base, and the bifurcated plate 43 is connected directly with said bite rim by heating it and forcing it into the wax as will be clear from Fig. 4. In the drawings, the wax bite rims are not distinguished from the base plates on which they are mounted in the usual manner. It is to be understood that both of the bite plates 27 and 23 have their wax bite rims worn down to proper occlusal curvature while in the mouth of the patient in accordance with well known dental practice.

Reference is now made to Fig. 2, in which 36' denotes a central head having a downwardly projecting threaded neck 37', said neck and head having a vertical opening 38'. The bifurcated plate 43' corresponds to the plate 43 and is adapted for connection with the lower bite plate 23. This plate 43' is rigidly carried by the upper end of a post 43ª which is rigidly secured to an L-shaped rearward projection 42' on the head 36'. The two arms 44' correspond to the arms 44 and they are adjustably mounted upon the stud 37', a nut 46' being provided to clamp them in adjusted position. The rear ends of these arms 44' have longitudinal slots 47' which slidably and non-rotatably receive guide lugs 56 (Fig. 2ª) on two shallow pans 57 which constitute moulds and retainers for the two soft record-forming members 20 and 22. Each pan has a downwardly projecting threaded stud 58 with which a nut 59 is engageable, whereby said pans may be locked after proper forward or rearward adjustment. A third shallow pan 60 constitutes a mould for the central soft record-forming member 21 and may be secured upon the head 36' by means of a screw 61 passed upwardly through the opening 38' of said head and its neck 37'. The upper end of the screw is engageable with an opening 61' in the bottom of the pan 60 (see Fig. 2ᴮ).

When the above described elements of Fig. 2 are assembled, they may rigidly connect the record-forming members 20, 21 and 22 with the lower bite plate 23 as seen in Fig. 5, the plate 43' being engaged with said bite plate 23 by heating it and forcing it into the wax bite rim of said bite plate, as will be clear from Fig. 5.

When connecting the plates 43 and 43' with the bite plates 27 and 23 respectively, due attention is of course given to properly centering said bite plates and to properly relating them with each other. To aid in doing this, a vertical pin which may well be the pin 25, for example, may be slid through the opening 38 of the neck 37 and head 36 as shown in Fig. 3, the lower end of said pin being then seated in the opening 38' of the head 36' and its neck 37'. The usual medial markings on the bite plates also of course aid in properly positioning them with respect to the plates 43 and 43'. These plates are connected with the bite plates before the upper arms 44 or lower arms 44' are connected with their respective heads 36 and 36', as will be clear from Fig. 3.

With the upper and lower units of the apparatus assembled as shown in Figs. 4 and 5, the apparatus is in readiness for connection with the patient's jaws, this being done by inserting the bite plates 23 and 27 into the patient's mouth and engaging them with his gums. The wax bite rims of these bite plates were of course formed on plaster models of the patient's jaws so that they will fit the gums perfectly. The apparatus engaged with the patient's jaws is illustrated in Figs. 6 and 7. After initial engagement, the recording pins 24, 25 and 26 are adjusted into proper cooperative relation with the record-forming members 20, 21 and 22, the adjustment being such that with the bite plates entirely closed, the blunt-pointed lower ends of the recording pins hardly more than penetrate the recording-forming members. Then, with the marking devices 24ª, 25ª and 26ª locked in raised position, the patient is instructed to perform natural chewing movements, and the arrows in Figs. 6 and 7 indicate that such movements are not merely up and down but are also forward, rearward and lateral. Moreover, as is well known, these jaw movements do not occur on straight lines and the various movements are to a large extent more or less gyratory. Whatever said movements may be, however, they are recorded by the recording pins 24, 25 and 26 in the soft record-forming members 20, 21 and 22. If the patient obviously does not make any extreme or otherwise abnormal jaw movements, the record grooves initially formed are left undisturbed and the recording pins adjusted further downward so that said grooves will be deepened while the chewing operations are continued, and such downward adjustment may be repeated as often as necessary to obtain record grooves of substantial depth, preferably one-sixteenth of an inch or deeper. Since the bite plates 23, 27 have their wax bite rims shaped to the proper occlusal curvature, I use these bite plates not only to establish the proper distance between the upper and lower jaws, which distance is known as "vertical dimension," but I employ the wax bite rims as a substitute for the teeth while the tracings are being recorded. These bite plates are hence my guiding elements during the formation of the tracings. It is because of the curvature of the occlusal surfaces of the bite rims, which curvature is developed by the patient with the bite rims in the mouth and in occlusal contact, the same as natural teeth would be while performing this same function, that I am able to develop three dimensional Gothic Arch tracings which will be in harmony with the curvature of the glenoid fossa and the condyle head. During mastication, the jaw moves in a multiplicity of curving glides from side to side and from front to back, and the height and depth of these curves are determined by the curvature of the condyle head and glenoid fossa; and my tracings will accurately record all these various movements of the human jaw during the process of mastication. If, however, the patient is obviously making abnormal jaw movements, the record grooves may be totally or partially obliterated at any time by means of a hot instrument, and the recording operation repeated until well defined record grooves 28 (see more particularly Fig. 8) are formed.

When the groove-forming operation is completed, the record-forming members and their grooves which now constitute soft records, are marked by lowering the marking devices or tripods 24ª, 25ª and 26ª and pressing their legs into the soft records sufficiently to form sockets in said soft records. Fig. 9 discloses the marking devices or tripods in the act of marking the records, and Fig. 10 illustrates the marks or sockets formed in said soft records, as indicated by the reference characters 30. It is either before or after so marking the soft records that the upper and lower bite plates are fastened together by means of the staples 29 or in other suitable manner, as disclosed in Fig. 9, said bite plates being preferably secured together in centric position. The entire apparatus is then taken from the patient and the entire lower unit of said apparatus (the unit of Fig. 5) is detached from the lower bite plate 23. It will be recalled that with the aid of these soft records, corresponding but hard records 20a, 21a and 22a are formed (see Fig. 11). These hard records may now be temporarily attached to the still-lowered tripods or marking devices 24a, 25a and 26a by means of small quantities of soft wax or the like, to aid in constructing an accurate articulator including said hard records and the pins 24, 25, 26.

From the foregoing taken in connection with the accompanying drawings, it will be seen that effective provision has been made for carrying out the objects of the invention, and while preferences have been illustrated and specifically described, attention is again invited to the possibility of making variations within the scope of the invention as claimed. For example, the making of the hard jaw-movement-records from the original soft records would be unnecessary if the plastic material used in making the original records were such that it would set up very hard in a few minutes after the recordings.

I claim:

1. In a method of producing artificial dentures permitting all natural chewing movements, the steps of mounting soft record-forming members horizontally on a lower bite plate, mounting recording pins vertically on a complemental upper bite plate, placing said bite plates in the patient's mouth and positioning said soft record-forming members and said recording pins in cooperable relation externally of the mouth, causing the patient to perform natural chewing movements until said recording pins form deep jaw-movement-record-grooves in said soft record-forming members, thereby converting the latter into soft jaw-movement-records, and marking said soft jaw-movement-records to record the exact relation of their record grooves with respect to said bite plates when viewed from above.

2. In a method of producing artificial dentures permitting all natural chewing movements, the steps of mounting soft record-forming members horizontally on a lower bite plate, mounting recording pins vertically on a complemental upper bite plate, placing said bite plates in the patient's mouth and positioning said soft record-forming members and said recording pins in cooperable relation externally of the mouth, causing the patient to perform natural chewing movements until said recording pins form deep jaw-movement-record-grooves in said soft record-forming members thereby converting the latter into soft jaw-movement-records, securing said upper and lower bite plates together while in the patient's mouth, and marking said soft records to record their exact relation with said secured-together bite plates.

3. An apparatus for recording human jaw movements, comprising a record-forming member, a recording pin cooperable with said record-forming member to convert the same into a record, means for rigidly connecting said record-forming member with one bite plate and disposing said member externally of the patient's mouth, means for rigidly connecting said pin with a complementary bite plate and disposing said pin externally of the mouth, a shiftably mounted record-marking device slidably but non-rotatably mounted on said pin and shiftable from a normally idle position to a predetermined operative position for marking the record to record the relation of said record with the bite plates, and means for securing said record-marking device against sliding movement on said pin when in an adjusted position.

4. An apparatus for recording human jaw movements, comprising a record-forming member, a recording pin cooperable with said member to convert the same into a record, means for rigidly connecting said record-forming member with one bite plate and disposing said member externally of the patient's mouth, means for rigidly connecting said pin with a complementary bite plate and disposing said pin externally of the mouth, means for holding said pin against rotation, and means slidably and non-rotatably mounted on said pin for marking the record to record its relation with the bite plates.

5. In an apparatus for recording human jaw movements, a central head having a downwardly projecting threaded neck and a vertical opening through said neck and the adjacent portion of the head, two diverging substantially horizontal arms having supports for record-forming members, said arms having openings in their inner ends through which said threaded neck passes, a nut threaded on the lower end of said neck and clamping said arms together and against said head, a support for a record-forming member, said support resting on said head, a securing element for said support extending through said opening of said head and neck, and means for rigidly connecting said head with a lower bite plate.

6. In an apparatus for recording human jaw movements, a head for disposition in front of the patient's mouth, said head having a vertical opening therethrough, means for rigidly connecting said head with a bite plate within the patient's mouth and for disposing said head externally of the patient's mouth, a vertical recording pin mounted in and projecting beyond said opening for disposition outside of the patient's mouth, two arms connected with and diverging rearwardly from said head, said arms being spaced apart to straddle the lower portion of the patient's face and being of a length to lie adjacent the patient's cheeks, and other recording pins mounted on the ends of said arms for disposition at the outer sides of the patient's cheeks.

7. In an apparatus for recording human jaw movements, a head having a vertical threaded neck and a vertical opening through said neck and the adjacent part of the head, means for rigidly connecting said head with a bite plate, two diverging arms having openings in their inner ends through which said neck extends, a nut on said neck clamping said arms together and to said head, a central recording pin mounted in said opening, and other recording pins mounted on said arms.

8. In an apparatus of the class described, having a recording pin and means for non-rotatably holding said pin, a record marking device slidably and non-rotatably mounted on said pin.

9. An apparatus for recording human jaw movements comprising upper and lower bifurcated plates to project forwardly from upper and lower bite plates within a patient's mouth, upper and lower heads secured to the front ends of said upper and lower plates respectively, for disposition outside of the patient's mouth, a central deformable record-forming member mounted on one of said heads, a central recording pin mounted on the other of said heads for co-action with said deformable record-forming member, upper and lower pairs of rearwardly diverging substantially horizontal arms having vertical-axis pivotal connections with said upper and lower heads respectively, said arms being of a length to extend rearwardly at the outer sides of the patient's cheeks, means for holding said arms against pivotal movement after adjustment into desired relation with the patient's cheeks, additional deformable record-forming members mounted on the rear ends of the arms which are connected with said one of said heads, and additional recording pins cooperable with said additional record-forming members and mounted on the ends of the arms which are connected with said other of said heads.

CLIFFORD S. KILE.

REFERENCES CITED

The following references are of record in the file of this patent:

UNITED STATES PATENTS

| Number | Name | Date |
|---|---|---|
| 2,119,824 | Miller et al. | June 7, 1938 |
| 2,043,394 | Reith | June 9, 1936 |
| 2,220,734 | Shanahan | Nov. 5, 1940 |
| 2,334,898 | Bigger et al. | Nov. 23, 1943 |
| 1,799,528 | Phillips | Apr. 7, 1931 |
| 2,245,288 | Moylon | June 10, 1941 |
| 2,027,373 | Eden | Jan. 14, 1936 |
| 1,119,051 | Snow | Dec. 1, 1914 |

FOREIGN PATENTS

| Number | Country | Date |
|---|---|---|
| 364,815 | German | Dec. 2, 1922 |